United States Patent [19]
Yarborough et al.

[11] 3,873,941
[45] Mar. 25, 1975

[54] DYE LASER HAVING NON-COLINEAR OPTICAL PUMPING MEANS

[75] Inventors: J. Michael Yarborough, Santa Clara; James L. Hobart, Los Altos Hills, both of Calif.

[73] Assignee: Coherent Radiation, Palo Alto, Calif.

[22] Filed: May 30, 1973

[21] Appl. No.: 365,315

[52] U.S. Cl............................................ 331/94.5 L
[51] Int. Cl............................................... H01s 3/09
[58] Field of Search .................................... 331/94.5

[56] References Cited
UNITED STATES PATENTS
3,739,295 6/1973 Shah .................................. 331/94.5
3,740,665 6/1973 Itzkan ................................ 331/94.5
3,753,146 8/1973 Reynolds et al. .................. 331/94.5
3,766,489 10/1973 Rosenberg et al. ................ 331/94.5

*Primary Examiner*—William L. Sikes
*Attorney, Agent, or Firm*—Limbach, Limbach & Sutton

[57] ABSTRACT

A dye laser is provided with an optical pumping means which is introduced within the optical resonator cavity obliquely and hence non-collinearly with respect to the optical path of the cavity.

6 Claims, 9 Drawing Figures

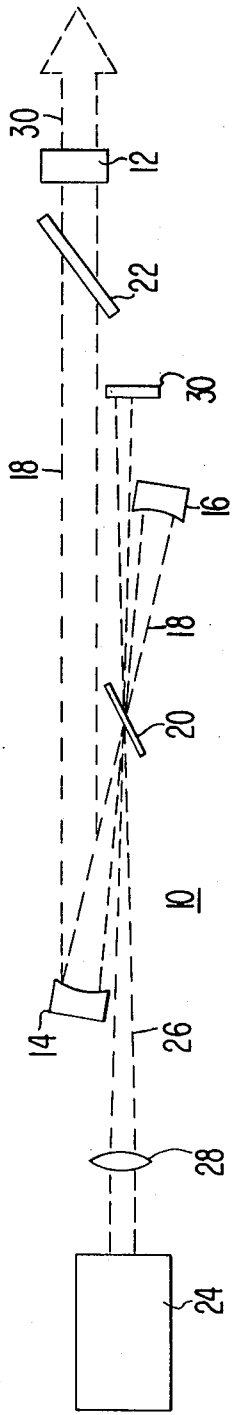
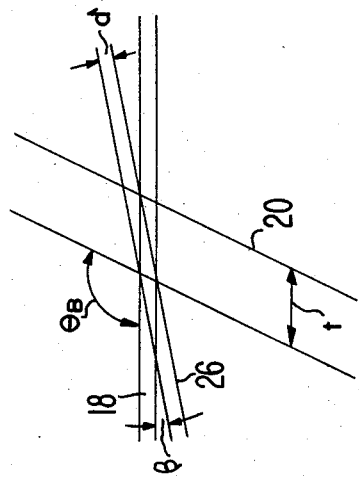
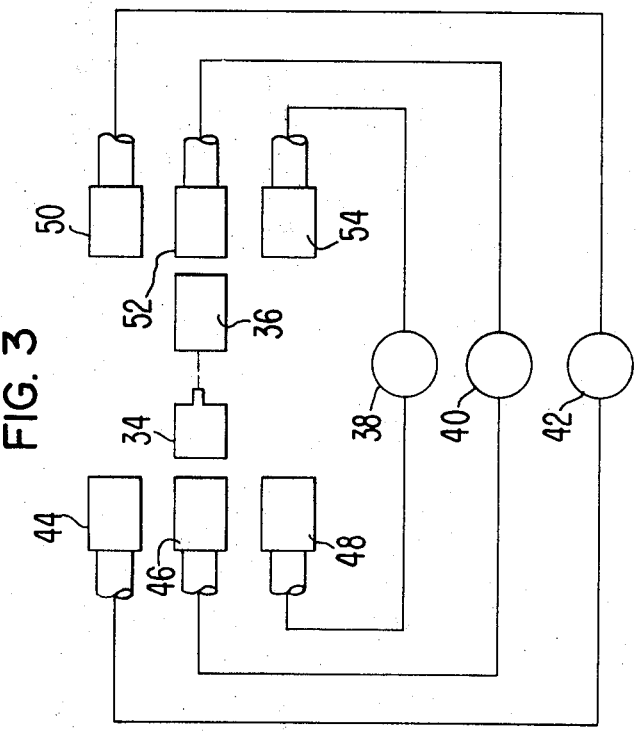
FIG. 1
FIG. 2
FIG. 3

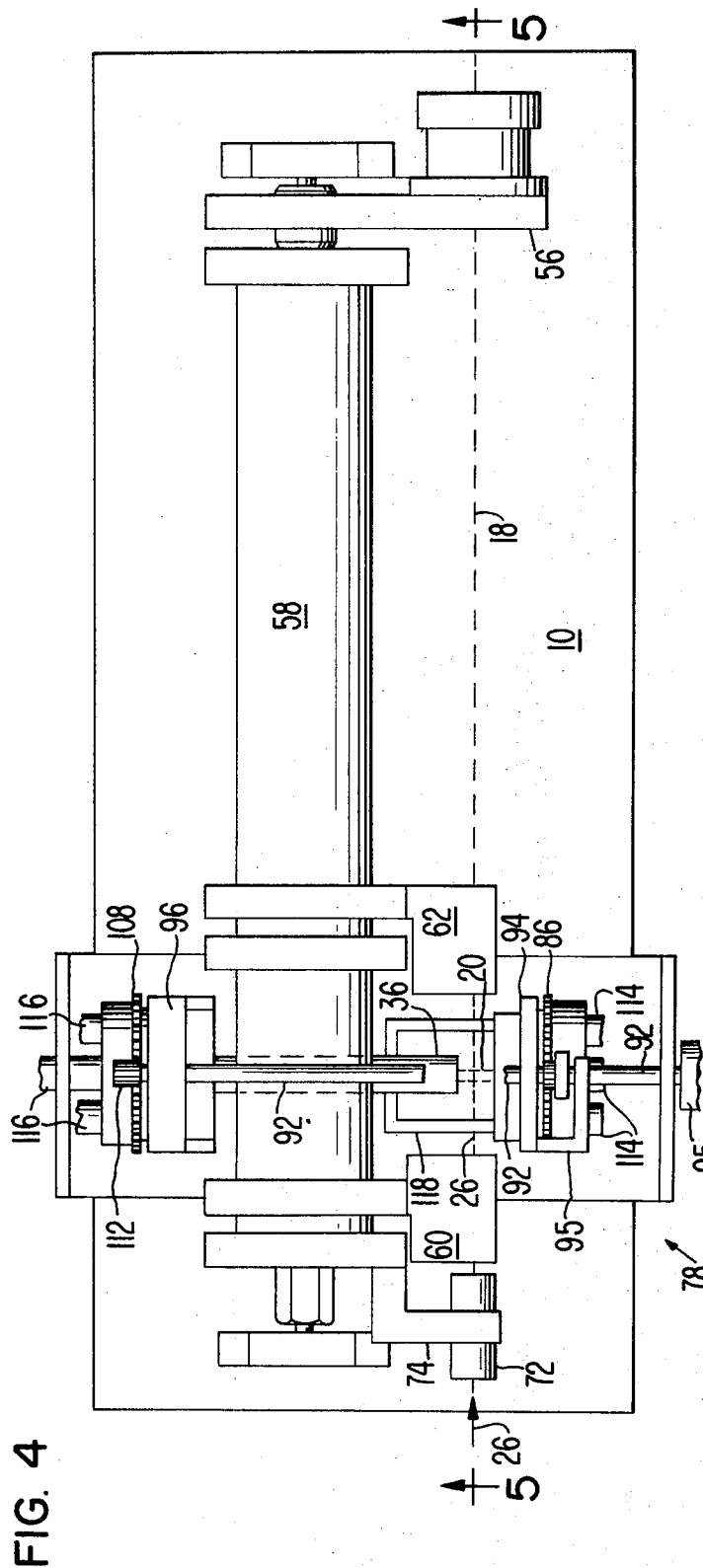
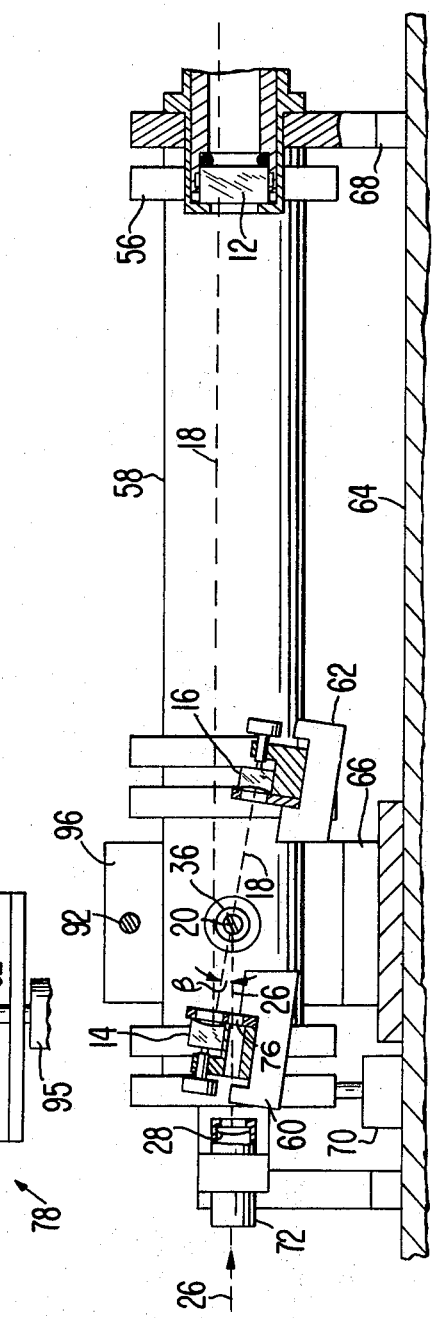
FIG. 4
FIG. 5

3,873,941

DYE LASER HAVING NON-COLINEAR OPTICAL PUMPING MEANS

BACKGROUND OF THE INVENTION

The present invention relates to dye lasers, and in particular, to improved means for optically pumping a dye laser.

Dye lasers have attracted much attention recently because of their property of being able to provide output wavelengths continuously over comparatively large segments of the visible spectrum. In contrast, other lasers are only capable of providing strong output wavelengths at a limited number of discrete wavelengths.

As with any laser, the active lasing material must be "pumped" to elevated excitation levels. In the case of a dye laser, this pumping excitation may be accomplished optically. That is, energy in the form of electromagnetic energy in the optical region of the spectrum must be directed at the dye. This includes not only energy in the visible part of the electro-magnetic spectrum, but, additionally, energy in the infrared and ultra-violet portions of the spectrum.

Prior to the present invention, optical pumping of a continuous wave dye laser has been accomplished by introducing the optical pump beam within the optical cavity resonator of the dye laser so that the pumping beam is collinear with respect to the optical path of the dye laser oscillations as the pump beam passes through the dye. The collinear requirement largely stems from the use of comparatively thick dye volumes, i.e., in the neighborhood of about 1,000 to 2,000 microns, with a cavity path having very narrow diameter or "waist" as it passes through the dye. The latter is desired in order to provide as high an energy density as possible to maximize the output of the dye laser. Typical "waist" diameters range from between about 10 to 40 microns.

To provide proper dye laser output mode, i.e., $TEM_{00}$ and to maximize the dye laser efficiency, the pump beam diameter is made to approximately match that of the dye laser oscillation waist.

If the dye thickness is in the range, for example, of 1,000 to 2,000 microns, and if the dye oscillation optical path and also the pumping beam is in the order of 10–40 microns, then the pumping beam must be co-axial or nearly co-axial with the optical path if a sufficient volume of the dye, within the path of the optical resonator, is to be excited by the pump beam. Or put another way, if the pump beam is not co-axial with the optical path of the dye laser oscillations, it will not be possible to elevate a sufficient number of dye atoms to sustain lasing action.

Several techniques have been used in order to provide collinear pumping. One common approach is to use an optical resonator reflector which is substantially totally reflecting with respect to the range of wavelengths generated by the dye, but which allows the passage of the pump beam wavelength, when a pumping source is directed through a reflector to be collinear with the optical path. See, for example, U.S. Pat. No. 3,707,687.

This technique has several significant disadvantages. The first is a disadvantage of all collinear pumping designs. Most of the pump beam is absorbed as it passes through the fluid dye. However, there is never 100% absorption and so with the collinear arrangement of the pumping beam, there will always be some of the pumping beam introduced into the output of the dye laser.

A second problem is the difficult task of designing and constructing an optical resonator reflector which has the desired optical properties of reflecting nearly 100% of the dye laser wavelengths, while transmitting through it nearly 100% of the pumping wavelengths. It is a very difficult and expensive task to design and construct a reflector which comes even close to these desired objectives.

Actual reflectors of this type have several important limitations. (1) It is not possible to design such mirrors to allow both 100% transmission of a plurality of pump beam wavelengths and 100% reflectance of the dye lasing wavelengths. Hence, overall efficiency is sacrificed. (2) As the tuned output of the dye laser approaches the wavelength of the pump beam, it becomes extremely difficult to operate the dye laser, because the reflector criteria described above cannot be met under those circumstances. (3) Because it is necessary for the pump beam to go through an optical resonator reflector, a significant amount of input pumping power is lost. (4) Finally, where ultra-violet pumping is utilized, the uv pumping has a deleterious effect on the mirror or reflector coating through which the pump beam passes.

Another approach for achieving collinear pumping of a dye laser takes advantage of the refraction characteristics of a dispersive prism. As is well-known, the angle of refraction of light through a dispersive prism is related to the wavelength of the light passing through it. A prism is situated in the optical path of the dye laser resonator cavity. The pumping beam is introduced obliquely relative to the optical path through the prism. By proper location of the prism, the refraction of the prism causes the pump beam to become aligned collinearly with the optical path of a resonator as it passes through the dye.

This technique has several significant disadvantages. Here, the pump beam is effectively limited to a single wavelength or a small range of wavelengths. This is because the refraction of the prism is different for different wavelengths and, hence, only a single wavelength or small range of wavelengths will be refracted collinearly with respect to the optical path; the rest will be refracted so as to be non-collinear and ineffective as a pump.

A second disadvantage is that the prism introduces some additional losses within the optical cavity both with respect to the dye laser oscillations as well as with respect to the pumping beam.

SUMMARY OF THE INVENTION

It is, therefore, an object of the present invention to provide improved means for optically pumping a dye laser.

Another object of the invention is to provide improved means for optically pumping a dye laser directly, without having to go through optical resonator reflectors or other optical devices associated with the cavity of the dye laser.

Another object of the invention is to provide a dye laser which can be simultaneously pumped by a plurality of laser pump beams.

Another object of the invention is to provide improved pumping means for a dye laser which enables a pump laser to operate on all lines.

Another object of the invention is to provide improved means for optically pumping a dye laser which does not introduce any of the pumping beam into the output of the dye laser.

Another object of the invention is to provide improved optical pumping means for a dye laser which does not require expensive and difficult to design and construct reflectors.

In accordance with the present invention, the pumping beam is aligned non-collinearly with respect to the optical path of the dye laser resonator cavity and directly impinges upon the dye rather than passing through an optical resonator reflector or prism. Thus, the pumping beam is directed through the dye obliquely with respect to the path of the dye laser oscillations.

To obtain and maintain laser action in the dye with the pumping beam directed non-collinearly, the dye stream must be sufficiently thin so that the pump beam overlaps the optical path of the dye laser over a sufficient volume as it passes through the dye, so that enough dye molecules are excited to sustain dye laser oscillations.

Assuming that the dye laser oscillation waist is made to have the same diameter as that of the pumping beam as it passes through the dye, it has been found empirically that for a given pump beam diameter, $d$, and dye stream thickness, $t$, that the maximum angle, $\beta_{max}$, which can be allowed between the pump beam and the optical path is given approximately by:

$$\beta_{max} \approx (d/t) \text{ radians or } (d/t) \times 57.3°$$

In other words, if one starts with the pump beam occupying the same volume as the optical path, i.e., they are collinear, and begins to angularly deflect the pump beam, keeping the entry point of the beam into the dye fixed, the beam may be tilted until the exit end of the pump beam has been displaced by its own diameter. If this angle is exceeded, the output of the dye lasers falls off rapidly and lasing action eventually terminates. The minimum angle $\beta$ is limited only by the physical dimensions of the system.

For a thick dye volume, the maximum angle permitted between the pump beam and the oscillating beam may be less than the diffraction angle of either beam. Consequently, the pump and oscillating beam will overlap everywhere in space and must, of necessity, pass through a common optical element. In the case of a thin volume, the maximum angle permitted between the pump and oscillating beam can be increased to be greater than the diffraction angle of either beam. Consequently, the beams will be physically separated and can pass through or be reflected by different optical elements.

For example, if the dye stream is 300 microns thick, and the pump beam diameter is 30 microns, the maximum angle, $\beta_m$, for satisfactory performance is given by:

$$\beta_m \approx (30/300) \text{ radians} = 0.1 \text{ radians or } 5.73°,$$

which is much greater than the diffraction angle of about 0.013 radians.

In accordance with the invention, the optical pumping beam need not go through an optical resonator reflector, or through a prism as required in the case of collinear optical pumping. Thus, specially designed mirrors do not have to be constructed, the losses due to such reflectors or to prisms are eliminated. Further, since the pumping beam is not collinear with respect to the optical path of the dye laser, there is no pump light mixed with the dye laser output.

Another advantage of non-collinear pumping of the dye stream is that it enables the use of more than one pumping beam. That is, by arranging a plurality of pump lasers, such that each is directed at a different angle with respect to the sye stream, increased pumping levels are achieved with a corresponding increase in the output of the dye laser.

Additionally, the use of a thin dye stream with non-collinear pumping allows the use of a much higher concentration of dye molecules within the solvent. It is well known that there is a finite destruction rate of the dye molecules by the pumping beam. Consequently, the length of time that a given quantity of dye solution can be used will be dependent on the number of dye molecules in the circulating volume. Higher concentrations thus lead to longer useful life of the dye solution given a fixed circulating volume.

BRIEF DESCRIPTION OF THE DRAWINGS

FIG. 1 is an optical schematic diagram of one aspect of an improved dye laser in accordance with the present invention.

FIG. 2 is an enlarged illustration of a part of the dye laser illustrated in FIG. 1.

FIG. 3 is a block diagram of another aspect of a dye laser in accordance with the present invention.

FIG. 4 is a detailed plan view of a dye laser in accordance with the present invention.

FIG. 5 is an elevational view of the dye laser of FIG. 1 in the direction indicated.

DESCRIPTION OF THE PREFERRED EMBODIMENTS

Figure 6:
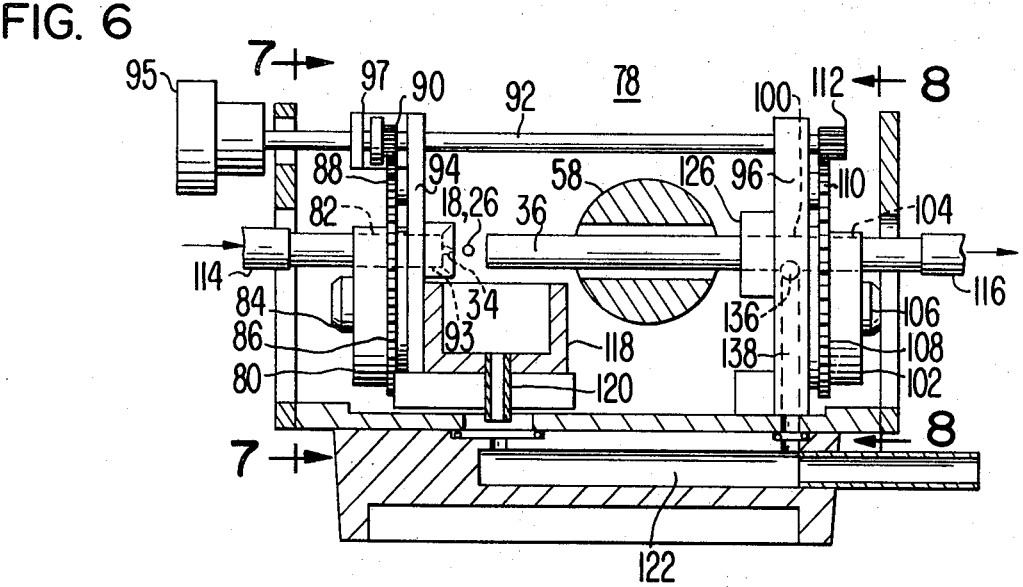
FIG. 6 is an elevational view of one part of the dye laser of FIG. 4.
Figure 7:
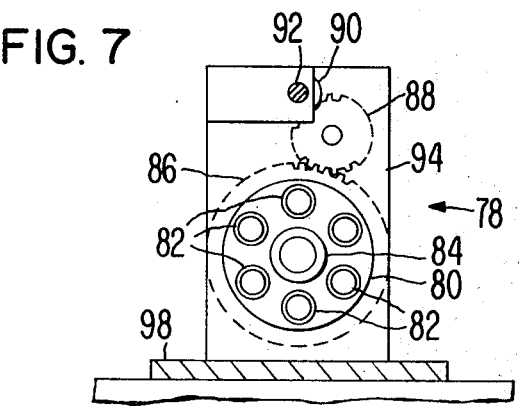
FIG. 7 is a cross-sectional view of the assembly of FIG. 6 in the direction indicated.
Figure 8:
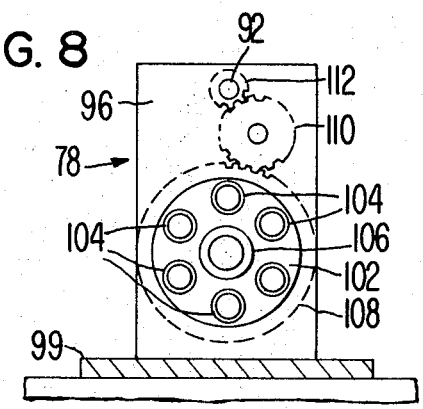
FIG. 8 is a cross-sectional view of the assembly of FIG. 6 in the direction indicated.

FIG. 1 is an optical schematic of a dye laser 10 in accordance with the present invention. Dye laser 10 includes an optical resonator cavity comprising an output coupler or reflector 12, a first substantially totally reflecting broad band reflector 14 and a second substantially totally reflecting broad band reflector 16. An optical path 18 is defined by the three reflectors 12, 14 and 16.

A dye stream or jet 20 intersects the optical path 18 at the focal point of the two reflectors 14 and 16. The arrangement of reflectors 12, 14 and 16 in this manner is a well-known technique to astigmatically compensate for the introduction of the fluid stream 20 at Brewster's angle with respect to the optical path 18. By being at Brewster's angle, there is maximum transmission of light through the fluid stream for light which is vertically polarized.

A tuning mechanism 22 also intersects the optical path 18. The purpose of tuning mechanism 22 is to adjust the output wavelength of the dye laser 10. Any number of suitable tuning mechanisms are available. One example is described in copending patent application entitled "Improved Tuning Apparatus for a Dye Laser," Ser. No. 365,317, Filed on May 30, 1974 by Hobart and Yarborough and assigned to the assignee of the present invention.

A laser 24 such as an argon ion laser is used to optically pump the dye stream 20. The output pumping beam 26 is focused by means of a focus lens 28 so that the pump beam is very narrow as it passes through the dye stream 20. A pump stop 30 absorbs any of the pump beam 26 which is not absorbed by the dye stream 20.

The pump beam 26 enters the optical cavity of the dye laser 10 obliquely with respect to the optical path 18. That is, the pump beam 26 is non-collinear with the optical path 18. This enables the dye stream 20 to be directly pumped by the pump beam 26 from laser 24. Since the pump beam is non-collinear with respect to the optical path 18, no part of the pump beam is introduced into the output beam 30 of dye laser 10 as a result of the pump beam 26.

An enlarged view of the dye stream 20 as it intersects the optical path 18 of the resonator cavity is illustrated in FIG. 2. For purposes of the illustration, it is assumed that both the pump beam 26 and the optical path 28 are constant in diameter as they pass through the dye. Although not exactly accurate, this is a reasonable approximation.

Note that the dye stream 20 is at Brewster's angle, $\theta_b$, to the optical path 18. The dye laser oscillations follow the optical path 18. Thus, it can be seen that as the dye laser oscillations pass through the dye 20, the width or waist of the dye laser oscillations is very small.

Assuming that the pump beam and dye laser oscillation waist are the same, it has been found that the angle $\beta$ between the optical path 18 and the pump beam 26 should be no greater than the angle defined as follows:

$$\beta_{max} = (d/t) \text{ radians} = (d/t) \times 57.3°$$

If the angle is greater than this, the efficiency of the dye laser 10 drops off rapidly and eventually the output from the dye laser 10 terminates.

A scheme for providing multiple dye streams within the resonator cavity of dye laser 10 is depicted in FIG. 3. By multiple dye streams, it is meant that a number of different dyes, each having different lasing wavelengths, can be provided within the dye laser resonator cavity. Each dye stream exits from a nozzle 34 and is received and collected by a collector member 36. For purposes of clarity, in the scheme depicted in FIG. 3, only three independent types of dyes can be introduced into the nozzle 34 to form the dye stream. Of course, it should be understood that any number of different dyes can be introduced.

Each different dye is provided with its own circulation system. Individual pump modules 38, 40 and 42 are provided for each different dye circulation system. Each of these modules contains a pump, a pump drive motor, a dye reservoir, and a filter with a typical pore size of two microns. The filter removes any impurities which could degrade or terminate the dye laser oscillations. A heat exchanger can also be provided as a part of each circulation system to remove heat absorbed in the dye laser. This increases the viscosity of the dye to lessen the formation of bubbles in the stream. Between 15-20°C. has proven to be a satisfactory dye temperature.

Connected to the output side of pump modules 38, 40 and 42 are conduits for transporting the dye which are terminated by nozzle input ports 44, 46 and 48, respectively. At any given time, one of these ports is aligned with the nozzle 34. Similarly, exits ports 50, 52 and 54 terminate another series of conduits which are linked to the input side of pump filtration modules 38, 40 and 42, respectively.

Means are provided so that any one of the pairs 44-50, 46-52 or 48-54 of ports can be aligned with the nozzle 34 and the collector member 36. When a pair of ports is in alignment, the pump module pumps the fluid through the exit port, through the nozzle 34 where it becomes an unsupported and unconfined fluid jet as it crosses the optical cavity of the laser. The dye is then returned to its pump modulue. Since each dye has a different range of wavelengths, the output range of wavelengths from dye laser 10 in accordance with the present invention is much greater than that for previous dye lasers utilizing only a single dye.

A more detailed illustration of a dye laser 10 incorporating the present invention is shown in FIGS. 4-9. Output reflector 12 is mounted within an output reflector support assembly 56 which, in turn, is mounted to resonator support rod 58. Reflector 14 is encased within a reflector support 60 which is supported by resonator support 58. Similarly, reflector 16 is mounted in a reflector housing 62 which likewise is supported by the resonator support 58. Resonator support 58 is attached to a baseplate 64 by a support pedestal 66 and support legs 68 and 70.

The focus lens 28 is secured within housing 72 which is, in turn, supported by member 74 attached to the resonator support 58. An aperture 76 is provided in reflector housing 60 to enable the pump beam 26 to pass under reflector 14 and intersect the dye stream 20 in the manner described previously. Suitable adjusting means are provided for each of the reflectors 12, 14 and 16 and the focusing lens 28.

A turret assembly 78 is provided to enable different dyes to pass through the optical cavity of dye laser 10. Reference is made particularly to FIGS. 4, 6, 7 and 8. Turret assembly 78 includes a rotary input plate 80 having a plurality of ports 82 extending around the circumference of the plate 80. Plate 80 rotates around a central hub 84 so that individual input ports 82 can be aligned with the nozzle 34.

Also provided around the circumference of the rotary plate 80 is a series of gear teeth 86. A pair of step down gears 88 and 90 are coupled to a rotatable shaft 92. By turning an adjusting knob 95, the rotary plate 80 can be rotated to align any one of the ports 82 with the nozzle 34.

Nozzle 34 is secured to a support plate 94 which includes a base portion 98 and an appendage 97 for supporting shaft 92. Gear 90 is mounted upon shaft 92, and gear 88 is secured to support plate 94. Shaft 92 can be rotated by knob 95.

Figure 9:
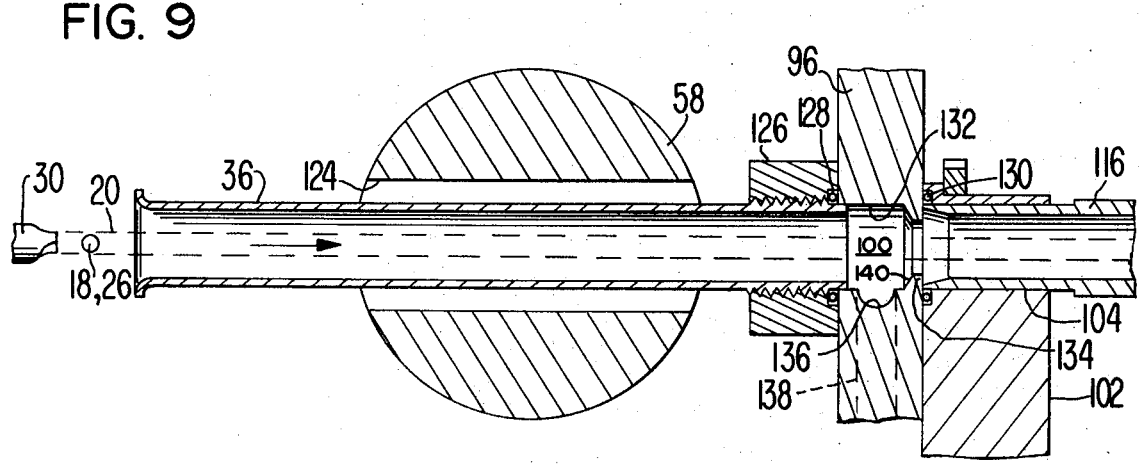
FIG. 9 is an enlarged view of a portion of the assembly of FIG. 6.

Collector member 36 is supported by support plate 96 extending upward from the turret baseplate 99. Referring additionally to FIG. 9, an aperture 100 extends through the support plate 96. An output rotary plate 102 similar to the input rotary plate 80 is provided with a plurality of spaced-apart ports 104 extending through the outer circumference thereof. Rotary plate 102 is mounted at its hub 106 so that each of the ports 104 can be aligned with the aperture 100 extending through the support plate 96.

A set of gear teeth 108 is also provided around the circumference of the output rotary plate 102. In engagement with the gear teeth 108 are first and second gears 110 and 112. Gear 112 has the same diameter as gear 90 and gear 110 the same as 88. The gear wheel defined by the gear teeth 108 has the same diameter as the gear defined by the gear teeth 86. Consequently, since gear 112 is connected to the same shaft 92 as gear 90, the two rotary plates 80 and 102 are ganged.

Input conduits 114 carry different dyes to each of the ports 82 formed in the input rotary plate 80. Similarly, output conduits 116 carry the dye fluids back from the individual ports 104 to the respective pump module for each.

In operation, when a particular dye is desired, the operator rotates the tuning knob 95 to align the desired input aperture 82 with the nozzle 94. If a different dye was previously in use, its pump must first be turned off. Because the output rotary plate 102 is ganged with the input rotary plate 80, the correct port 104 will automatically be aligned with the collecting member 36. The pump for the desired dye is then turned on and the dye flows through the input conduit 114, through the rotary plate 80 and out of the nozzle 34 as a flat, unsupported, unconfined fluid stream. If desired, the switching for carrying out this function can be built into the turret assembly.

The dye stream passes through the collector member 36, through aperture 100, through the output rotary plate port 104 and finally it is returned through the output conduit 116 back to the dye pump module. Any dye which does not pass through collector member 36 falls into a reservoir 118 which is provided with a series of drain tubes 120 and 122 for removing this wastedye.

Referring particularly to FIGS. 6 and 9, the collector member 36 extends through a passageway 124 provided through the resonator support member 58. To maintain a waterproof seal between the collector 36 and the output rotary plate 96, a threaded nut 126 is used to tightly hold an O-ring 128 against plate 96. O-rings 130 are also provided to seal each of the exit ports 104, as well as the input ports 82 (not shown). Input ports 82 not in alignment with the nozzle 34 are blocked by plate 94. Similarly, exit ports 104 not in alignment with the collector 36 are blocked by plate 96.

Whenever a dye stream is terminated and as the stream collapses, some of the dye will drop to the bottom part of the collecting member 36. Thus, when another dye stream is introduced, it is desirable to prevent intermixing of the new dye with the old dye remaining in the collecting member.

To accomplish this, aperture 100 extending through the plates 96 includes a first region 132 having a greater diameter than a second region 134, which is nearest the exit port 104. Running along the bottom of section 132 is a trough 136 connected to an output pipe 138. Once a new dye stream is fully established, it extends all the way from the nozzle 34 through the aperture 100 and into the output conduit 116. Thus, substantially none of the dye accumulates within the collector member 36. However, when a dye stream is first started up, it strikes along the bottom of the collector member 36. This has the effect of flushing out any dye remaining from a previous operation. The old dye is swept along the collector tube 36 and into the trough 136 and out the outlet 138. The stepped face 140 between the larger diameter portion 132 and the smaller diameter portion 134 of the aperture 100 prevents the old dye from entering into the outlet tube 116, thereby preventing contamination.

When the pump is turned off to terminate a dye stream 20, most of the dye which remains in the nozzle 34 is drawn back into the pump and reservoir. Whatever dye does remain is the first which leaves the nozzle 34 when a new dye is introduced and, as explained previously, falls along the bottom of the collector member 36 and eventually is swept out of the exit conduit 138. Thus, there is little possibility of any substantial contamination of the new dye with any remaining old dye.

A typical volume of dye for any given circulation system is around 1,500 cm$^3$. The volume of the nozzle which retains the dye in one specific example is 0.01 cm$^3$. It can be seen that even in the worst case, that is with the nozzle completely filled with the old dye and if all the old dye gets into the new dye, it would take many repeated operations for any substantial contamination to occur.

The nozzle 34 can be made from a small tube whose end is stamped down to define a narrow slit. This slit defines the geometry of the dye stream 20. In one embodiment, the aperture of the nozzle 34 is 0.01 inch thick by 0.06 inch long.

A suitable motor to circulate the dye is one made by Micro-Pump, Model No. 15-60-303. This pump has a pumping force of about 40 lbs. per square inch and provides a dye velocity of approximately 6 meters per second.

While the foregoing describes the present invention in sufficient detail to enable one skilled in the art to duplicate it, the following table of parameters of one actual embodiment of a dye laser incorporating the present invention is set forth:

| | |
|---|---|
| Reflector 12 | Flat reflector, 4% transmissive |
| Reflector 14 | 7.5 cm. radius; high reflectance |
| Reflector 16 | 5 cm. radius; high reflectance |
| Spacing between Reflector 12 and Reflector 14 | 30 cm. |
| Spacing between Reflector 14 and Reflector 16 | 8.75 cm. |
| Focal point of Reflectors 14 and 16 (position of fluid stream 20) | 3.75 cm. from reflector 14<br>5.0 cm. from reflector 16 |
| Focus lens 28 | 6 cm. |
| Spacing between lens 28 and dye stream 20 | 6 cm. |
| Pump laser 24 | Argon ion laser, Model 52, manufactured by Coherent Radiation |
| Examples of four different dyes and their wavelength ranges | 5300 A – 5850 A Sodium Fluorescein<br>5700 A – 6400 A Rhodamine 6G<br>5900 A – 6550 A Rhodamine B<br>6500 A – 7000 A Cresyl Violet |
| Dye Carrier | 2 grs. dye/ 1½ liters ethylene glycol |

The tuning mechanism 22 shown in FIG. 1 has not been shown in FIGS. 4–9 for purposes of clarity. However, it is to be understood that the tuning device described in the copending patent application referred to above could be inserted within the resonator cavity to effectuate tuning of dye laser 10.

We claim:
1. A continuous wave dye laser comprising:
   a. an optical resonator cavity which defines an optical path for dye laser oscillations;
   b. a dye; means for directing said dye as an unsupported flowing film to intersect said optical path within said cavity;

c. a laser for providing a continuous wave pump beam for optically pumping said dye;

d. means for directing said pump beam at said dye by introducing said pump beam within said optical cavity obliquely with respect to said optical path, such that said pump beam is non-collinear with respect to the path of said dye laser oscillations.

2. A dye laser as in claim 1 wherein the plane defined by said unsupported flowing film is at Brewster's angle to said optical path.

3. A dye laser as in claim 2 wherein said beam directing means includes means for focusing said laser pump beam to increase the optical energy density at the point where said pump beam intersects said dye.

4. A dye laser as in claim 1 wherein the angle formed by said pump beam and said optical path does not exceed approximately $d/t$ radians, where $d$ is the diameter of the pump beam as it goes through the dye, $t$ is the thickness of the dye stream, and wherein the pump beam diameter is approximately the same as that of the dye laser oscillations as they both pass through the dye.

5. In a continuous wave dye laser wherein the dye is introduced across the optical path of the optical resonator cavity thereof as an unsupported thin flat fluid stream, wherein the invention comprises:

a continuous wave laser for optically energizing said dye to energy states necessary for lasing action by directing the output beam thereof upon said fluid stream, non-collinearly with respect to said optical path, whereby none of said pump beam is introduced into the output of said dye laser.

6. A dye laser as in claim 5 wherein said flat fluid dye stream is inclined at Brewster's angle to said optical path.

* * * * *